United States Patent
Hanchett et al.

(10) Patent No.: US 11,813,949 B2
(45) Date of Patent: Nov. 14, 2023

(54) METHODS AND APPARATUS FOR CHARGING AN ELECTRIC VEHICLE

(71) Applicant: Atlis Motor Vehicles, Inc., Mesa, AZ (US)

(72) Inventors: Mark Hanchett, Mesa, AZ (US); Matt Wilkins, Portland, OR (US); Ross Compton, Norwich (GB)

(73) Assignee: Atlis Motor Vehicles, Inc., Mesa, AZ (US)

( * ) Notice: Subject to any disclaimer, the term of this patent is extended or adjusted under 35 U.S.C. 154(b) by 374 days.

(21) Appl. No.: 17/215,603

(22) Filed: Mar. 29, 2021

(65) Prior Publication Data

US 2022/0258629 A1  Aug. 18, 2022

Related U.S. Application Data

(60) Provisional application No. 63/003,199, filed on Mar. 31, 2020.

(51) Int. Cl.

| | |
|---|---|
| *H02J 7/00* | (2006.01) |
| *B60L 53/18* | (2019.01) |
| *B60L 53/16* | (2019.01) |
| *B60L 58/12* | (2019.01) |
| *B60L 53/302* | (2019.01) |
| *E05B 47/00* | (2006.01) |

(Continued)

(52) U.S. Cl.
CPC ............. *B60L 53/18* (2019.02); *B60L 53/16* (2019.02); *B60L 53/302* (2019.02); *B60L 53/62* (2019.02); *B60L 58/12* (2019.02); *E05B 47/0012* (2013.01); *E05B 65/00* (2013.01); *H02J 7/0045* (2013.01); *H02J 7/0049* (2020.01)

(58) Field of Classification Search
USPC ................. 320/106, 107, 108, 109, 110, 112
See application file for complete search history.

(56) References Cited

U.S. PATENT DOCUMENTS

| | | | | |
|---|---|---|---|---|
| 2013/0012054 A1* | 1/2013 | Andresen | ............... | H01R 24/28 439/476.1 |
| 2013/0300429 A1* | 11/2013 | Jefferies | .................. | B60L 53/31 324/511 |

(Continued)

FOREIGN PATENT DOCUMENTS

| | | | | |
|---|---|---|---|---|
| CN | 105103396 A | * | 11/2015 | .......... B60L 11/1811 |
| CN | 104276053 B | * | 8/2016 | .............. B60L 53/14 |
| DE | 102015218486 A1 | * | 3/2017 | |

*Primary Examiner* — Brian Ngo
(74) *Attorney, Agent, or Firm* — Letham Law Firm PLLC; Lawrence Letham

(57) ABSTRACT

A charging station for an electric vehicle includes a handle attached to a cable for carrying a current from the charging station to the battery of the electric vehicle to charge the battery. While the charging station is not charging an electric vehicle, the handle is positioned in a socket of the charging station. The charging station includes a locking mechanism for locking the handle in the socket while performing testing. The electric vehicle includes a receiver into which the handle is inserted for charging the battery of the electric vehicle. The handle includes structures that cooperate with a locking mechanism of the vehicle to lock the handle in the receiver while the battery the vehicle is charged. The cable and handle may be cooled by a liquid medium.

20 Claims, 5 Drawing Sheets

(51) Int. Cl.
    *E05B 65/00*     (2006.01)
    *B60L 53/62*     (2019.01)

(56) References Cited

U.S. PATENT DOCUMENTS

2019/0027867 A1*   1/2019   Ognjanovski ...... H01R 13/6683
2020/0156492 A1*   5/2020   Mackenzie ............ B60L 53/65

* cited by examiner

METHODS AND APPARATUS FOR CHARGING AN ELECTRIC VEHICLE

FIELD OF THE INVENTION

Embodiments of the present disclosure relate to charging electric vehicles.

BACKGROUND

Electric vehicles include batteries that provide the power to operate the electric vehicle. The batteries must occasionally be recharged. The amount of time required to recharge the battery of an electric vehicle may be significant. It would be beneficial to have a charging station that provided information as to its availability and efficiently recharged batteries.

BRIEF DESCRIPTION OF THE DRAWING

Embodiments of the present invention will be described with reference to the drawing, wherein like designations denote like elements, and.

DETAILED DESCRIPTION

Charging Station

Figure 1:
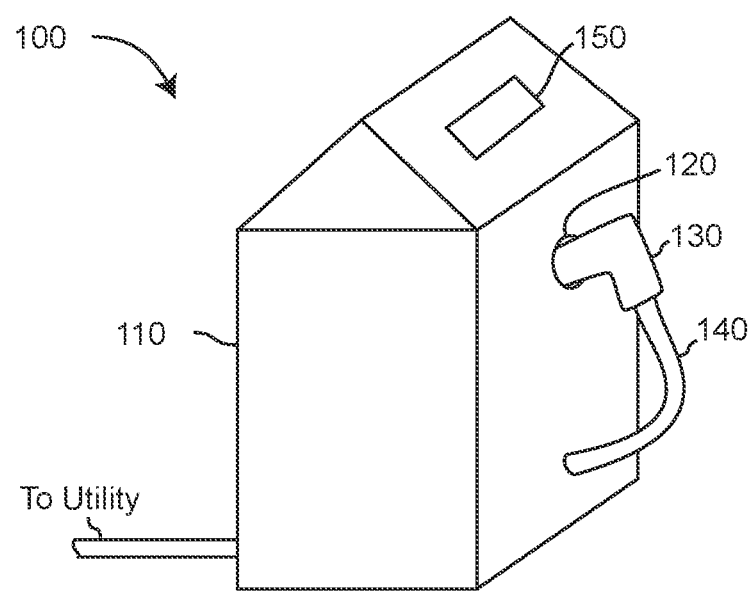
FIG. 1 is a perspective view of a charging station.
Figure 4:
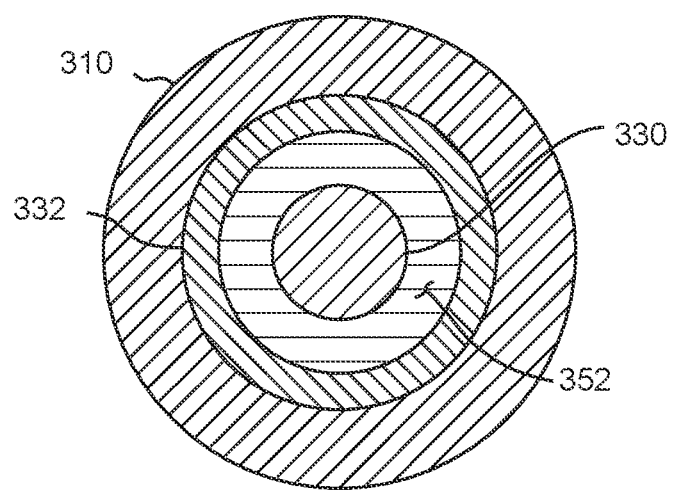
FIG. 4 is an end view of the handle of FIG. 3.
Figure 6:
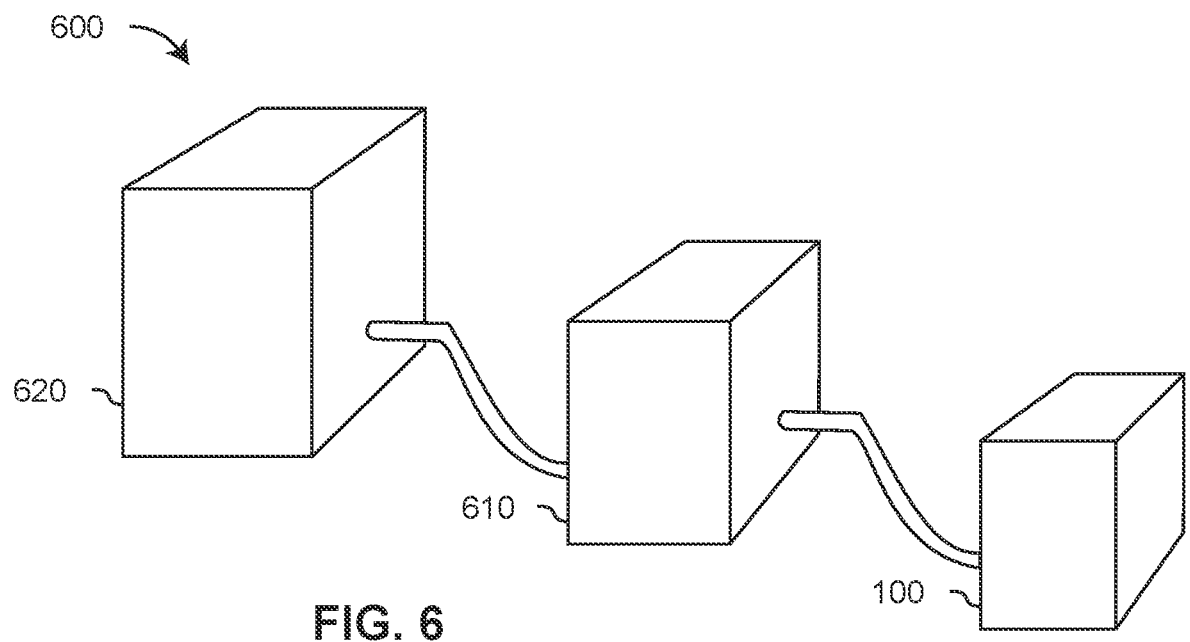
FIG. 6 is a diagram of a power source that provides power to a charging station.
Figure 7:
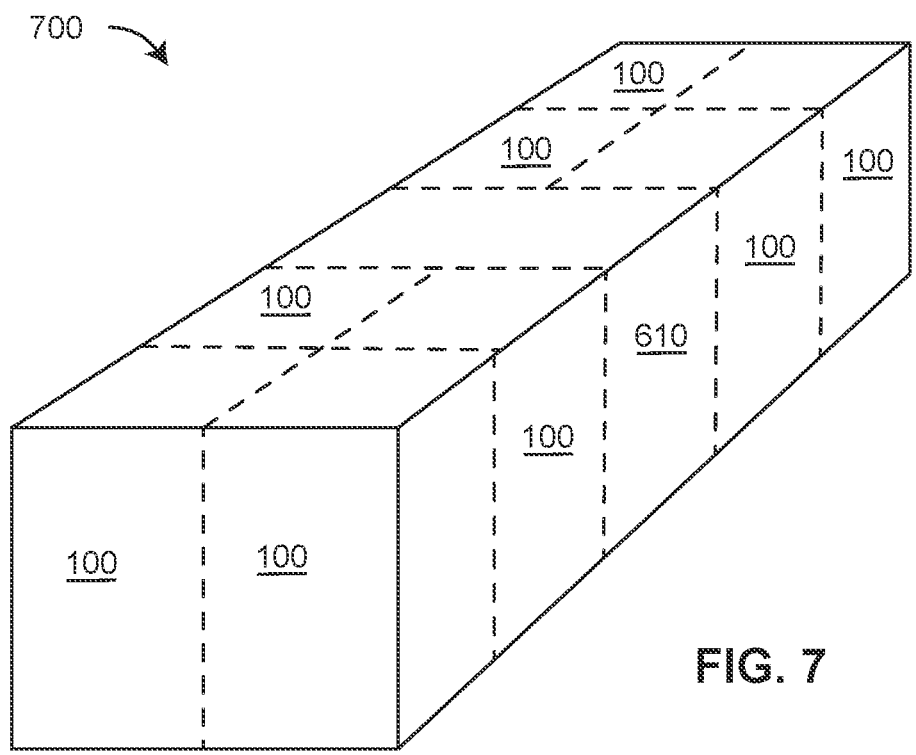
FIG. 7 is a diagram of a shipping container holding a plurality of charge stations and a battery.

A charging station, as best shown in FIGS. 1 and 6-7 performs the function of providing a current to an electric vehicle to charge a battery of the electric vehicle. A charging station may perform self-tests to determine an operating status (e.g., condition) of the charging station. A charging station may receive energy (e.g., power, current) from a source for providing a current to the battery of the electric vehicle. A source of power includes a utility company.

A charging station may include a housing, a socket, a cable, a handle, an indicator, a detector, a locking mechanism, a pump, a first terminal and a second terminal, and a test circuit. The handle includes an electrode and a ring.

For example, the charging station 100 includes the housing 110, the socket 120, the electric cable 140, the handle 130, the indicator 150, the detector 260, the locking mechanism 280, the pump 290, the first terminal 272, the second terminal 274 and the test circuit 270. The handle 130 includes an electrode 330 and a ring 332.

Housing and Socket

The housing 110, as best shown in FIG. 1, may include any type of container or structure suitable for housing (e.g., containing, holding) the components, in whole or in part, of the charging station. The housing 110 encloses at least the test circuit 270, the detector 260 and the pump 290. The housing includes connectors for connecting to the power lines (not shown) from a utility company. The housing 110 includes a socket 120. The socket 120 may be shaped to receive the handle 130. The handle 130 may be placed in the socket 120 when not in use charging a battery of an electric vehicle. The first terminal 272 and a second terminal 274 may be at least partially positioned in the socket 120. The first terminal 272 and the second terminal 274 electrically couple to the test circuit 270. The voltage applied to the first terminal 272 and the second terminal 274 may be applied to the electrode 330 and the ring 332 while the handle 130 is positioned in the socket 120. The test circuit 270 may apply a voltage across the first terminal 272 and the second terminal 274. The first terminal 272 of the second terminal 274 may carry a current responsive to the voltage applied by the test circuit 270.

The housing 110 may be weather resistant. A top portion of the housing 110 may be shaped (e.g., pitched) so that water and/or moisture from the elements (e.g., rain, sleet, snow, hail) slide from the top of the housing 110, so the housing 110 remains relatively clear. The housing 110 may include one or more grates or open lattice works to permit the passage of air into, through and out of the housing 110 to cool the components inside the housing 110. The housing 110 may include one or more fans to assist in movement of air through housing 110.

An inner surface of socket 120 may include seals (e.g., O-rings, gaskets) to seal around an exterior surface of the handle 130. As handle 130 is inserted into socket 120, the seals seal between an inner surface of socket 120 and an outer surface of handle 130. The seals maintain a seal between an inner surface of socket 120 and an outer surface of handle 130 while the handle 130 is inserted into the socket 120. The seals resist the penetration of moisture into the socket 120. A receiver in an electric vehicle may also include seals for sealing around the handle 130 while it is inserted into the receiver. In another implementation, the seals are located on the handle 130. The seals may be made of an insulator to decrease the likelihood that the current provided via the handle 130 exits (e.g., discharges from) the receiver in the electric vehicle or from the socket 120 during testing.

A First Terminal and a Second Terminal

Figure 2:
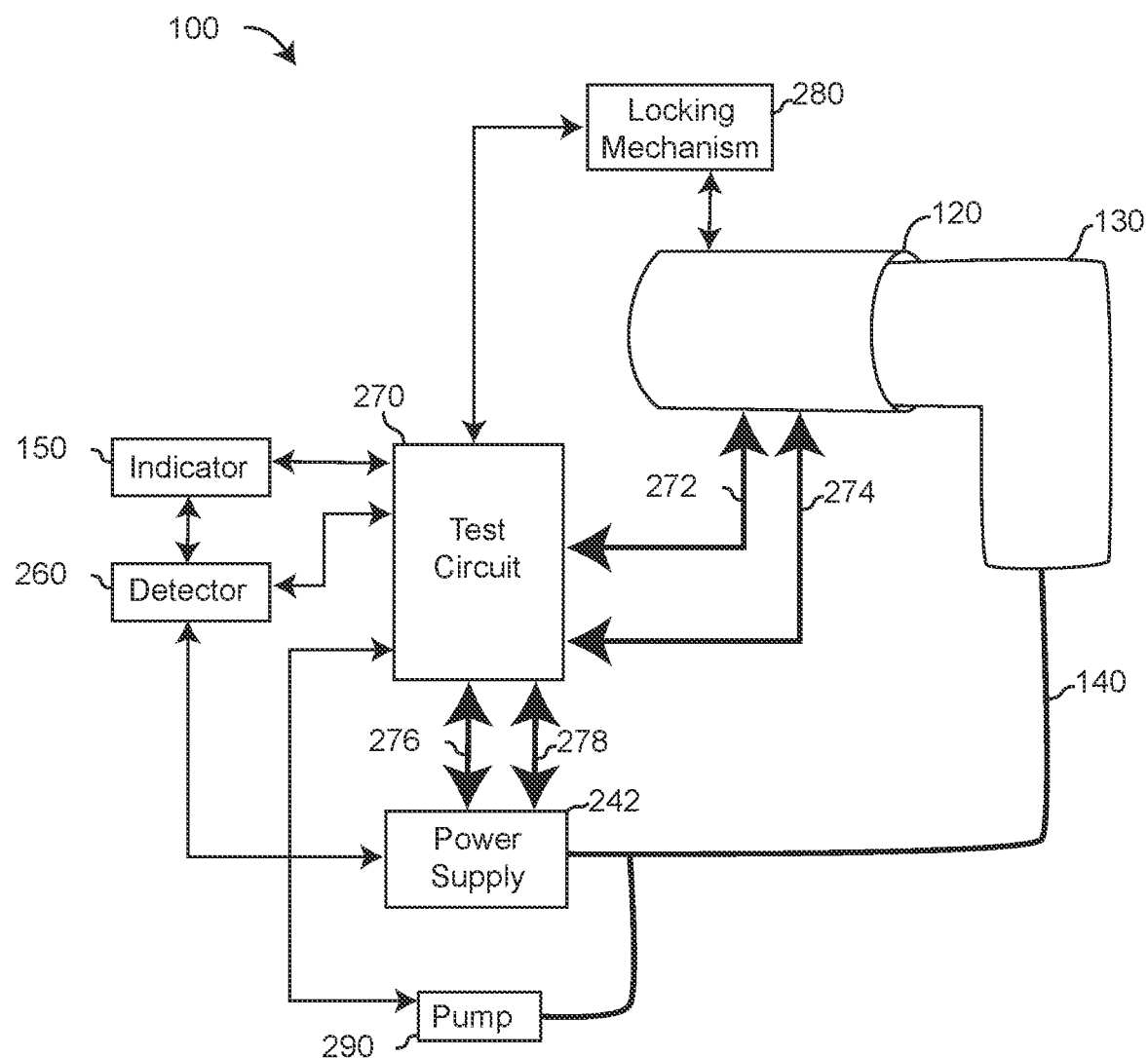
FIG. 2 is a diagram of the charging station of FIG. 1.

The charging station 100 may include a first terminal 272 and a second terminal 274 as best shown in FIG. 2. The first terminal 272 and the second terminal 274 may be positioned at least partially in the socket 120.

A Handle

The charging station 100 includes the handle 130. The handle 130, as best shown in FIGS. 1-4, plugs (e.g., inserts, is placed) into a receiver (e.g., socket, plug) on an electric vehicle to transfer charge (e.g., a current) from the charging station 100 to the battery of the vehicle. The handle 130 may provide a current to the battery to charge the battery. After the battery of the electric vehicle has been charged, the handle 130 may be removed from the receiver and placed into socket 120. The handle 130 may remain in socket 120 until its next use for charging a battery of an electric vehicle.

The handle 130 includes an electrode 330, a ring 332, a housing 310 and a grip 320. The charging handle 130 may include structures for cooperating with the locking mechanism 280 to secure the handle 130 in the socket 120. For example, turning handle 130 may include threads 360.

The electrode 330 and the ring 332 electrically couple to the battery of the electric vehicle to form a circuit to provide a current to the battery. The electrode 330 and the ring 332 electrically couple to the first terminal 272 and the second terminal 274 to form a circuit with the test circuit 270 for testing. The electrode 330 may be referred to as having a positive polarity while the ring 332 may be referred to as having a negative or ground polarity.

Figure 3:
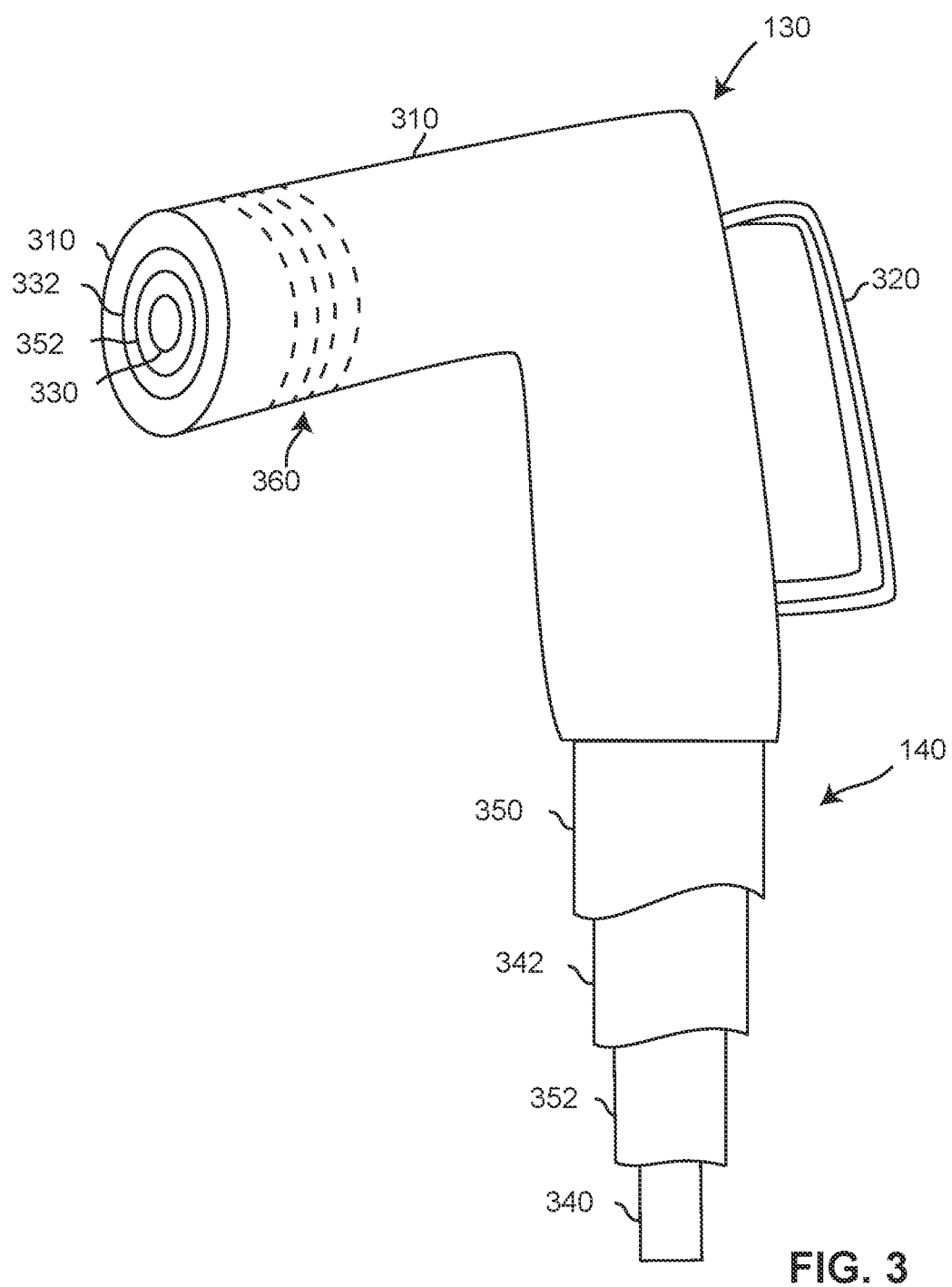
FIG. 3 is a perspective view of a handle and an electrical cable.

With reference to FIG. 3, the electrode 330 and the ring 332 may protrude from the end of the handle 130 to couple to the socket 120 and the receiver of an electric vehicle. In another implementation, the electrode 330 and the ring 332 may be recessed into handle 130. In another implementation, the electrode 330 is recessed into the handle 130 and the ring 332 protrudes from the handle 130. Extending (e.g., protruding from the handle 130) or retracting (e.g., receding into the handle 130) increases a surface area of the electrode 330 and the ring 332 for physically coupling to the socket 120 or the receiver of an electric vehicle for establishing an electrical connection. A coupling that has a greater surface area reduces the current density that flows through the coupling. Decreasing the current density may decrease, somewhat, the heat generated by the flow of the current through the handle 130.

The grip 320 provides a structure for a user to grasp while moving the handle 130 or inserting the handle 130 into the socket 120 or the receiver on an electric vehicle.

The housing 110 of the handle 130 may include a first channel and a second channel, not shown, for containing the flow of a liquid medium. The first channel and the second channel may be positioned proximate to the electrode 330 and/or the ring 332. As the liquid medium flows through the first channel and the second channel of the handle 130, the liquid medium may transfer heat to or remove heat from the electrode 330 and the ring 332. In an implementation, the first channel and the second channel of the handle 130 remove heat from the electrode 330 and the ring 332 to cool the electrode 330 and the ring 332 during charging.

Handle 130 may include any number of channels for cooling the handle 130 and the components thereof. A channel may conduct the flow of a liquid medium against a surface of the electrode 330 and the ring 332 for greater effectiveness in heating or cooling the electrode 330 and the ring 332.

While the handle 130 is not being used to charge the battery of an electric vehicle, the handle 130 may be stowed in (e.g., inserted into, placed into, positioned in) the socket 120.

Electric Cable

The charging station 100 includes the electrical cable 140. The electric cable 140 includes the insulator 350, the conductor 342, the insulator 352 and the conductor 340. The electrical cable 140 is mechanically and electrically coupled to the charging handle 130. The conductors 340 and 342 of the electrical cable 140 electrically couple to the electrode 330 and the ring 332 respectively of the charging handle 130. The electrode 330 may be designated as having a positive polarity. The ring 332 may be designated as having a negative or ground polarity. The insulators 350 and 352 insulate the conductors 340 and 342 respectively to protect the conductor 340 and 342 from the elements and from shorting out.

The conductors 340 and 342 of the electrical cable 140 are electrically coupled to a power supply 242 of the charging station 100. The conductors 340 and 342 may establish a circuit for providing a current at a voltage. The current provided through the circuit established by the conductors 340 and 342, and thereby via the electrode 330 and the ring 332, may be used to recharge a battery of an electric vehicle. The current may flow through the circuit into the electric vehicle to charge the battery of the electric vehicle. The conductor 342 may perform the function of a ground. The conductor 342 may perform the function of a conductor at a negative voltage or ground potential. While the handle 130 is inserted into a receiver on an electric vehicle, the conductor 340 and the electrode 330 electrically couple to a first terminal of the battery of the electric vehicle and the conductor 342 and the ring 332 electrically couple to a second terminal of the battery to provide a current to the battery to recharge the battery. The power supply 242 provides the current to the battery of the electric vehicle via a circuit that includes conductor 340, the electrode 330, the first terminal of the battery, the second terminal of the battery, the ring 332, and the conductor 342.

The conductor 340 and/or 342 may be flexible. In an implementation, the conductors 340 and 342 are formed of a plurality of metal wires that are spirally wound to provide flexibility. In another implementation, the conductors 340 and 342 may be formed of a plurality of metal wires that are braided to provide flexibility. Some portions of the wires that forms the conductors 340 and 342 may be solid while other portions may be comprised of a plurality of wires that are combined together in a manner to be flexible. For example, a portion of conductors 340 and 342 positioned inside the housing 310 of the handle 130 may be solid. The conductors 340 and 342 positioned inside (e.g., covered by) the insulators 350 and 352 respectively may include a plurality of wires that are wound or woven together (e.g., spiral, braid) to be flexible.

The conductors 340 and 342 may be of sufficient gauge (e.g., thickness, capacity) to carry at least 1000 amps at 1600 volts. The capacity of the conductors 340 and 342 may be increased by increasing the number of metal wires used to form the conductors 340 and 342. The capacity of the conductors 340 and 342 may be increased by increasing a thickness of any solid metal for metal wires used to form the conductors 340 and 342. The insulator 352 and the insulator 350 may be able to withstand at least 1000 V across them without damage. The electrode 330 and the ring 332 may include a surface area for electrically coupling to the conductor 340 and the conductor 342 respectively. For example, the electrode 330 may extend for a distance inside the housing 310. The conductor 340 may physically contact the electrode 330 along the distance to have a greater surface area for establishing the electrical connection between the electrode 330 and the conductor 340. The ring 332 may also extend for a distance inside the housing 310 to provide a greater surface area for establishing an electrical connection with the conductor 342. The conductor 340 and the conductor 342 may be physically coupled to the electrode 330 and the ring 332 to establish the electrical connection between the conductor 340 and the electrode 330, and the conductor 342 and the ring 332. Physical coupling to establish an electrical connection may include soldering, welding, crimping, or any other type of physical structure to establish an electrical connection.

The electrical cable 140 may be retractable with respect to housing 110. The electric cable 140 may at least partially retract into housing 110.

Channels in Handle and in Electric Cable

A housing 310 of the handle 130 and the electrical cable 140 may include channels (not shown in FIGS. 3-4) for carrying a fluid medium to heat or cool the handle 130 and/or the electric cable 140. The electric cable 140 may include a first channel and a second channel in addition to the conductor 340 and the conductor 342. The handle 130 may include a first channel and a second channel in addition to the electrode 330 and the ring 332. The first channel and the second channel of the electric cable 140 may be in fluid communication with the first channel and the second channel of the handle 130. Because the channels of the electric cable 140 may be in fluid communication with the channels of the handle 130, a liquid medium that passes through the first channel and or the second channel of the electric cable 140 may also pass through the first channel and the second channel of the handle 130.

Figure 5:
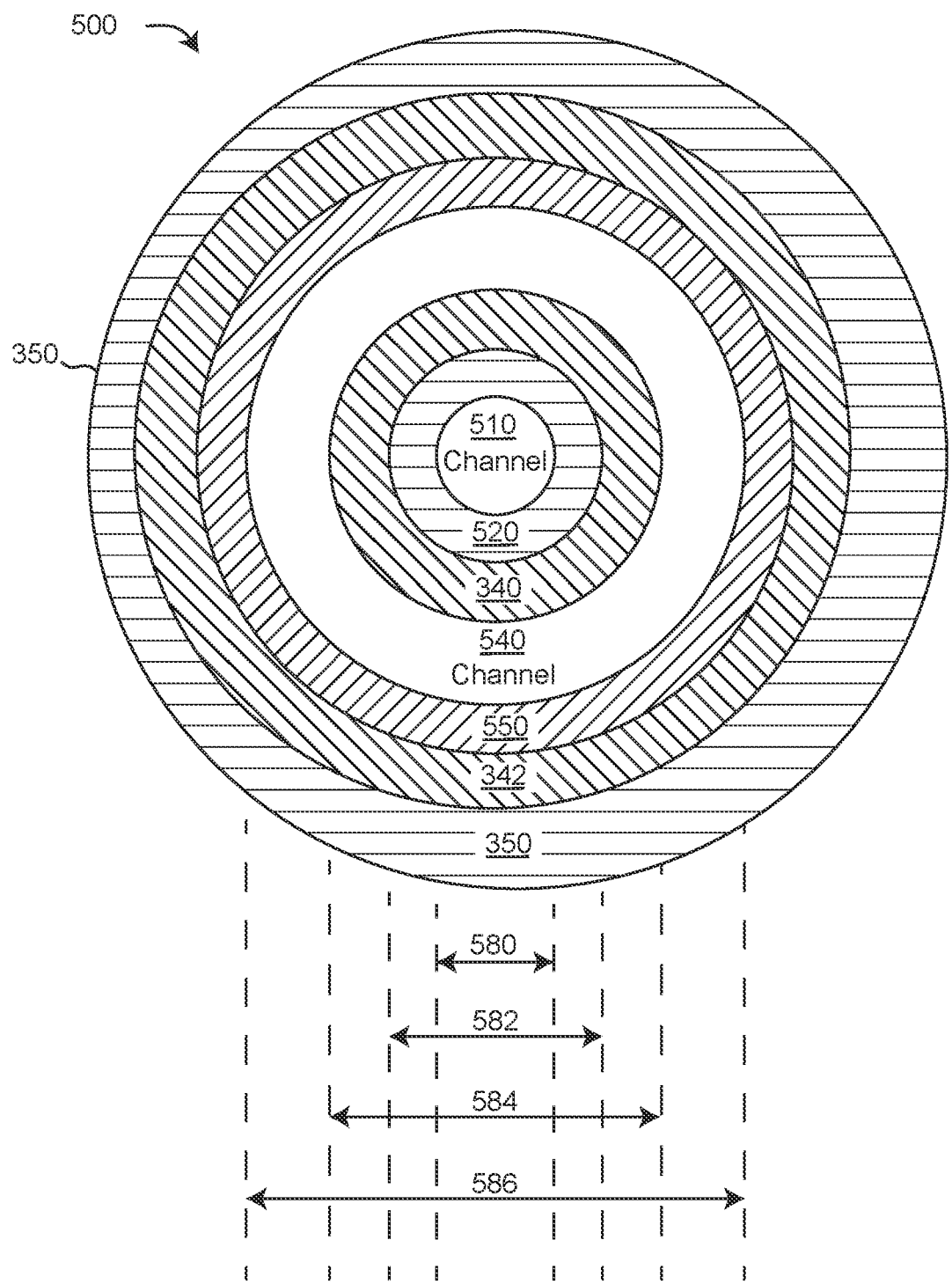
FIG. 5 is a diagram of another implementation of the electrical cable of FIG. 3.

The channels of the handle 130 may surround or be positioned close to (e.g., proximate to, against) the electrode 330 and the ring 332. The channels of the electric cable 140, as best shown in FIG. 5, may surround and/or be positioned close to the conductors 340 and 342. A liquid medium that flows through the channels of the handle 130 may be brought into contact with the electrode 330 and the ring 332 to transfer heat to or from the electrode 330 and the ring 332. A liquid medium that flows through the channels of the electric cable 140 may be brought into contact with the conductor 340 and the conductor 342 to transfer heat to or from the conductor 340 and the conductor 342.

As the fluid medium flows through the channels of the handle 130 and/or the electrical cable 140, heat may be transferred from the fluid medium to the electrode 330, the ring 332, the conductor 340 and the conductor 342 to heat them. As the fluid medium flows through the channels of the handle 130 and/or the electrical cable 140, heat may be transferred from electrode 330, the ring 332, the conductor 340 and the conductor 342 to the fluid medium to cool them. The liquid medium may flow through the first channel and through the second channel of the cable and through the first channel and the second channel of the handle to maintain a temperature of the conductor 340, the conductor 342, the electrode 330 and the ring 332 at a predetermined temperature.

The fluid medium may circulate through the channels and through a heater and/or a cooler to maintain the temperature of the fluid medium and thereby maintain the temperature of the conductor 340, the conductor 342, the electrode 330 and the ring 332 at a predetermined temperature. For example, as the temperature of the fluid medium rises, a cooler may be used to reduce the temperature of the fluid medium. As the temperature of the fluid medium decreases, a heater may be used to increase the temperature of the fluid medium. The fluid medium may operate to maintain the conductors 340 and 342 at a constant temperature.

The pump 290 may be used to circulate the liquid medium through the first channel and the second channel of the handle 130 and the electric cable 140.

A Locking Mechanism

A locking mechanism, as shown in FIG. 2, may secure (e.g., lock, hold, fix) the handle 130 in the socket 120 of the charging station 100. For example, a locking mechanism 280 may mechanically secure the handle 130 in the socket 120. A locking mechanism 280 may be positioned, at least partially, in the socket 120. The locking mechanism 280 may extend, at least in part, out from the socket 120 to an exterior the housing 110. The locking mechanism 280 may be positioned entirely in the socket 120. The locking mechanism 280 may be adapted to lock (e.g., secure, hold, fix) the handle 130 in the socket 120 while the handle 130 is inserted into the socket 120. Preferably, when the handle 130 is removed from a receiver (e.g., socket, plug) of an electric vehicle, the handle 130 is inserted into the socket 120 where the locking mechanism 280 may secure the handle in the socket 120. While the locking mechanism 280 secures the handle 130 in the socket 120, the handle 130 may not be removed from the socket 120. The locking mechanism 280 may secure the handle 130 in the socket 120 while the test circuit 270 performs tests.

The testing circuit 270 may control the operation of the locking mechanism 280. The testing circuit 270 may control the locking mechanism 280 lock prior to performing a test and after performing a test. The testing circuit 270 may control (e.g., operate, actuate) the locking mechanism 280 to secure the handle 130 in the socket 120 prior to performing a test and while performing the test. The testing circuit 270 may control the locking mechanism 280 to physically engage the locking mechanism 280 with the handle 130 to secure the handle 130 in the socket 120. After testing is complete, the testing circuit 270 may control the locking mechanism 280 to release (e.g., disengage, free) the handle 130 so that the handle 130 may be removed from the socket 120. The testing circuit 270 may control the locking mechanism 280 to physically disengage the locking mechanism 280 from the handle 130 to release the handle 130 from the socket 120. After release, the handle 130 may remain in the socket 120 until removed by a user to charge a battery in a vehicle.

While locking, the locking mechanism 280 may move (e.g., pull) the handle further (e.g., deeper) into the socket 120. While unlocking, the locking mechanism may move (e.g., push) the handle 130 outward (e.g., less deep) in the socket 120. While the handle 130 is positioned in the socket 120 and the locking mechanism 280 secures the handle 130 in the socket 120, the first terminal 272 and the second terminal 274 electrically couple to the handle 130. After the locking mechanism 280 releases the handle 130, the first terminal 272 and the second terminal 274 may continue to electrically couple to the handle 130 or the electrical coupling between the first terminal 272 and the second terminal 274 and the handle 130 may also be released.

The locking mechanism 280 may secure the charging handle 130 in the socket 120 using any force (e.g., magnetic force, resilient force) and/or any mechanical structure (e.g., bayonet mount, threads, latch, quick release couplings). A locking mechanism may include a resilient force (e.g., spring, rubber) for pulling the handle 130 into a socket and/or ejecting the charging handle 130 a least partially from a socket.

In an implementation, the socket 120 includes a rotating locking mechanism 280. As the locking mechanism 280 rotates in a first direction (e.g., clockwise), the locking mechanism 280 mechanically engages a structure (e.g., threads) of the charging handle 130. As the locking mechanism 280 engages the structure of the charging handle 130, the locking mechanism 280 pulls the charging handle 130 further (e.g., deeper) into the socket 120. The test circuit 270 may control operation of the locking mechanism 280.

For example, as the charging handle 130 is pulled into socket 120, the first terminal 272 and the second terminal 274 establish an electrical connection with the electrode 330 and the ring 332 respectively of the handle 130. Because the electrode 330 and the ring 332 electrically couple to the conductors 340 and 342 of the electric cable 140 respectively, the electrical connection between the first terminal 272 and the second terminal 274 establishes an electrical connection between the first terminal 272 and the second terminal 274 with the conductors 340 and 342 respectively. The electric cable 140 electrically couples to the power supply 242. The power supply 242 electrically couples to the test circuit 270 via conductors 276 and 278. So, bringing the first terminal 272 and the second terminal 274 into an electrical connection with the electrode 330 and the ring 1734 establishes an electric circuit through the test circuit 270, the handle 130, the electric cable 140, and the power supply 242. The test circuit 270 may control the power supply 242 to drive a current through the circuit to test the components of the circuit. For example, the test circuit 270 may control the power supply 242 to apply a voltage across the conductor 340 and the conductor 342 thereby applying a voltage across the circuit to perform a test.

When the testing of the circuit that includes the charging handle 130 and the electrical cable 140 is complete, the locking mechanism 280 may rotate in a second direction, opposite the first direction (e.g., counterclockwise), to release the handle 130. As discussed above, releasing the handle may disconnect the electrode 330 and the ring 332 from the first terminal 272 and second terminal 274 respectively, thereby electrically disconnecting the charging handle 130 and the electrical cable 140 from the testing circuit 270.

In an implementation, while the testing circuit 270 performs a test, the testing circuit 270: controls the locking mechanism 280 to secure the handle 130 in the socket 120, controls the power supply 242 to apply a voltage across the conductor 340 and the conductor 342 to perform the test; and after the test, the testing circuit 270 controls the locking mechanism 280 to release the handle 130 in the socket 120.

In an implementation, the locking mechanism 280 includes a first threads (not shown" and the handle 130 includes a second threads as best shown in FIG. 3. While the handle 130 is inserted into the socket 120, the locking mechanism 280 rotates in a first direction whereby the first threads engaged the second threads to secure the handle 130 in the socket 120. After testing is complete, the locking mechanism 280 rotates in a second direction, opposite the first direction, whereby the first threads disengage from the second threads to release the handle 130 from the socket 120.

In another implementation, the locking mechanism 280 comprises a hook and the handle 130 comprises a lip. To secure the handle 130 in the socket 120, the locking mechanism 280 positions the hook over the lip. The locking mechanism 280 may apply a force to the hook to secure the hook to the lip. To release the handle 130, the locking mechanism 280 removes the hook from the lip.

Test Circuit

A charging station 100 may perform self-diagnostic tests. While the charging handle 130 is not in use with an electric vehicle, it may be inserted into the socket 120. As discussed above, while the handle 130 is inserted into the socket 120, the test circuit 270 may perform one or more tests on the handle 130, the electrical cable 140, the power supply 242, the pump 290, the detector 260, the conductors 276 and 278, first terminal 272 and second terminal 274 and the locking mechanism 280. The test circuit 270 may control the locking mechanism 280 to lock (e.g., retain) the handle in the socket 120, so it may not be removed, while testing the handle 130 and the electrical cable 140.

Tests may include stress tests that test the maximum current and maximum voltage that may be provided by the power supply 242 and used with the charging handle 130 and the electrical cable 140. During testing, the test circuit 270 may control the power supply 242 two apply the maximum voltage to the electric cable 140 so that the maximum current flows through the conductor 340, the conductor 342, the electrode 330, the ring 332, the first terminal 272, the second terminal 274, the conductors 276 and 278 and the power supply 242. Tests may further include measuring the impedance of the electrical path through the charging handle 130 and the electrical cable 140 or any of portion of the circuit established during testing. Testing may include detecting the temperature of the charging handle 130 and the electrical cable 140. Testing may include testing the integrity of the insulators 350 and 352. The test circuit 270 may control the power supply 242 in whole or in part while conducting the tests. The test circuit 270 may electrically couple to the power supply 242 via the conductors 276 and 278. The conductor 276 and 278 may carry a current. Conductors 276 and 278 may include additional conductors for providing control signals to power supply 242.

During testing, test circuit 270 may further control the pump 290. The test circuit 270 may control the pump 1692 to pump a liquid medium through the electric cable 140 and the handle 130. The test circuit 270 may instruct the pump 1692 heat or cool the liquid medium, so as to perform thermal tests on the electric cable 140 and the handle 130. Thermal tests may include heating or cooling the electric cable 140 and the handle 130 to a maximum or a minimum temperature. Thermal tests may be conducted at the same time as electrical tests, so temperature may be a component (e.g., factor) of an electrical test. The test circuit 270 may cooperate with the pump 1692 perform electrical and thermal tests at the same time.

The test circuit 270 may further provide information, such as test results, to indicator 1654 displayed to a user. The test circuit 270 may further receive information (e.g., data) from the detector 260. The detector 260 may provide information as to the voltage across the power supply.

Detector

The detector 260 may detect the voltage on the battery of the electric vehicle. While the handle 130 is inserted into a receiver of an electric vehicle, the detector 260 may detect the output voltage of the battery of the electric vehicle. The detector 260 may detect the output voltage of the battery via the power supply 242. The detector 260 may report the magnitude of the voltage of the battery. The detector 260 may report the magnitude of the voltage of the battery to the indicator 150 and/or the test circuit 270.

The detector 260 may have or receive information regarding a capacity of the battery in the electric vehicle. In accordance with the capacity and the output voltage of the battery, the detector 260 may determine an amount of charge held by the battery. The detector 260 may report the amount of charge held by the battery to the indicator 150, to the power supply 242, and/or to the test circuit 270. In accordance with the information regarding the output voltage of the battery and/or amount of charge held by the battery, the detector 260 may determine whether power (e.g., energy, a current) should or should not be delivered to a vehicle. The detector 260 may report to the power supply 242 whether the battery should or should not receive energy.

The detector 260 may include a processing circuit and a voltage meter. The voltage meter may detect an amount of charge on the battery by detecting the output voltage of the battery. The voltage meter may detect the output voltage of the battery via the power supply 242. The voltage meter may detect the output voltage of the battery via the electric cable 140. The processing circuit may convert the output voltage of the battery into an amount of charge held by the battery. The processing circuit may convert the information regarding the amount of charge held by the battery into indicia of the amount of charge held (e.g., stored) by the battery. The indicia of the amount of charge held by the battery may be presented on indicator 150.

The detector 260 may detect the voltage on the power supply 242. The detector 260 may detect an amount of current provided by the power supply to the battery in an electric vehicle.

Indicator, Information Provided and Wireless Communication

An indicator may provide information to a user of the charging station 100. For example, indicator 150 provides information to a user. The indicator 150 is positioned at least partially on an exterior of housing 110 so as to be visible to a user. The indicator 150 may provide information as to the operating status of the charging station 100. The operating status of the charging station 100 may include charging, idle, available, not available, self-test, inoperable, completion of charging. The indicator 150 may provide information as to the status of a test being performed and/or a result of a test that has been performed. The indicator 150 may provide information as to the amount of charge held by a battery that is being charged by the charging station 100. The indicator 150 may report the temperature of the handle 130, the electric cable 140 and/or the liquid medium. The indicator 150 may report the operating status of the pump 290 and/or the power supply 242. The indicator 150 may report the status of the locking mechanism 280 (e.g., locked, unlocked).

The indicator 150 may receive information from the detector 260, the test circuit 270, the power supply 242, the locking mechanism 280 and the pump 290. The indicator 150 may report some or all of the information it receives. The indicator 150 may report information that it has received by presenting the information on the indicator 150. The indicator 150 may present the information in any manner, for example, the indicator 150 may include a display, LED lights and/or a speaker for presenting information visually and/or audibly. The indicator 150 may further provide haptic (e.g., vibrations, tactile) information.

In an implementation, the indicator 150 includes one or more lights that may be illuminated with a variety of different colors. For example, the indicator 150 may provide a red colored light when the charging station 100 is not ready for use and a green colored light when the charging station 100 is available for use. The indication of whether the charging station 100 is ready for charging a vehicle or not may be simple (e.g., red, green) for ready comprehension by a user. The indicator 150 may further provide additional information to a technician by using different colors or flashing the lights of the indicator 150 a particular number of times. The indicator 150 may provide information to a technician such as faults detected, self-test status, self-test results, firmware update status, power supply status, number of uses since last inspection, date and time of last inspection by a technician, and any other information that may be useful to maintain, repair, and/or verify operation of the charging station 100.

The charging station 100 may further include a communication circuit (not shown). Information may be provided to a user and/or a technician via the communication circuit. A communication circuit may communicate (e.g., transmit, receive) with a user and/or a technician via wireless communication. A communication circuit may communicate with a technician and/or a remote office via wired communication. A communication circuit may communicate via the Internet. A user or a technician may use a handheld device (e.g., smart phone) to receive information from the charging station 100.

A vehicle that uses the charging station 100 may also be wirelessly coupled to the Internet. Accordingly, a vehicle may receive information from the charging station 100 wirelessly, either directly or via the Internet. The information may include the status (e.g., in use, available for use) of the charging station 100. If the charging station 100 is in use, the information may further include an estimation of time when the charging station 100 will be available for use by a different user. For example, the charging station 100 may wirelessly report the estimated remaining time of the current charging cycle. A user may use information received wirelessly to determine whether they want to wait for the vehicle ahead of them to charge or whether they should find a different charging station. In the event that the charging station 100 is performing a self-test, it may also report the remaining time of the test, so that a user may know how long they will need to wait until the charging station is available for use.

The charging station 100 may receive information from the vehicle either directly or via the Internet.

Status information from many charging stations located at various geographic locations may be aggregated and reported wirelessly to users. Users may use aggregated information to determine a location of a charger that is presently available for use. A charging station may also communicate with proximate vehicles at the physical location of the charging station and report the number of vehicles that may be waiting in line for charging stations at the geographic location or for a particular charging station.

While charging, the indicator 150 may also provide information as to the amount of time remaining to complete charging. The remaining time for charging may be communicated as a number that is decremented while charging. The remaining time for charging may be communicated by the number of lights illuminated with the number of lights illuminated decreasing or increasing while charging. The time remaining for charging may be communicated by a length of a line of illuminated lights that decreases or increases while charging. The time remaining for charging may be communicated by different colors that change in accordance with the time remaining. The same principles may be used for reporting when a battery is charged.

For example, when the charging handle 130 is attached to a vehicle, the indicator 150 may change from a green color to a red color to indicate that the charging station 100 that was available is now not available because someone has begun using it. Before and during charging, the charging station 100 may determine a level of charge on the battery of the vehicle. The charging station 100 may determine the level of charge on the battery of the vehicle by way of detector 260 that detect the output voltage of the battery via power supply 242. The charging station 100 may also receive information directly from the vehicle regarding the level of charge on the battery via wireless communication. The indicator 150 may indicate (e.g., present, display) the level of charge using a color, such as:

Red=empty (<⅙ full);
Red-orange=⅙ full;
Orange=⅓ full;
Yellow=½ full;
Leaf green=⅔ full;
Blue green=⅚ full;
Blue=full (charging finished).

Any combination of colors may be used to report any amount of charge or any portion of the total amount of charge held by the battery so that the user may estimate the amount of time remaining for charging.

In an implementation, the charging station 100 includes the indicator 150 and the detector 260. The detector 260 detects an amount of charge on the battery of the electric vehicle. The detector 260 reports the amount of charge on the battery to the indicator 150. The indicator 150 progressively displays different colors to indicate the amount of charge held by the battery.

In an implementation, the charge capacity (e.g., total possible amount of charge) of the battery of the vehicle is divided into a number of equal portions. As a detector 260 reports the amount of charge on the battery to the indicator 150, the indicator 150 presents a first color to indicate that the battery is fully charged. The indicator 150 presents a second color to indicate that the amount of charge on the battery is less than one of the portions.

Pump

The charging station 100 may include a pump 290. The pump 290 may be used to circulate a liquid medium through the first channel and the second channel of the handle 130 and/or the electric cable 140. The pump 290 may include a heater and/or a cooler to heat or cool respectively the liquid medium. The pump 290 may fluidly couple to the first channel and the second channel of the handle 130 separate from the first channel and the second channel of the electric cable 140. The pump 290 may fluidly couple to the first channel and the second channel of the electric cable 140 and circulate the liquid medium through the first channel and the second channel of the handle 130 via the first channel and the second channel of the electric cable 140.

In an implementation, the first channel of the electric cable 140 fluidly couples to the first channel of the handle 130. The first channel of the handle 130 fluidly couples to the second channel of the handle 130. The second channel of the handle 130 fluidly couples to the second channel of the electric cable 140. In this implementation, pump 290 sends liquid through, in order, the first channel of the electric cable 140, the first channel of the handle 130, the second channel of the handle 130 and the second channel of the electric cable 140.

And Electric Vehicle and a User

A vehicle may communicate with the charging station 100. A vehicle may inform a charging station 100 that it is disconnecting the handle 130 from the receiver of the vehicle prior to disconnecting, so that the power supply 242 may discontinue providing the charging current.

An electric vehicle may include a locking mechanism. An electric vehicle may include a locking mechanism that secures the handle 130 in the receiver of the vehicle while the charging station 100 is recharging the battery of the vehicle. The locking mechanism of the vehicle may operate in a manner similar to the locking mechanism 280.

The locking mechanism on the vehicle protects a user from extracting (e.g., pulling out) the handle 130 from the receiver during use, so the user is not potentially exposed to high currents. The locking mechanism on a vehicle may further establish an electrical connection between the electrode 330 and the ring 332 and the terminals of the battery by bringing the electrode 330 and the ring 332 into firm physical and electrical contact with the terminals of the battery or with wires that connect to the terminals of the battery.

Another Implementation of the Electrical Cable

Another implementation of the electrical cable 140 is shown in FIG. 5. Electrical cable 500 includes channel 510, tube 520, conductor 340, channel 540, tube 550, conductor 342, and insulator 350.

The tube 520 is hollow. The channel 510 is the interior of tube 520. Tube 520 is formed of a material that is an electrical insulator and is thermally conductive. The conductor 340 is electrically conductive and also thermally conductive. The conductor 340 may be metal wires that are spirally-wound around the tube 520. A medium, preferably a liquid, flows through (e.g., in) channel 510. As the liquid medium flows through channel 510, the medium either extracts heat from or provides heat to conductor 340.

The liquid medium may be any type of liquid suitable for conducting or delivering heat. The liquid medium may include ethanol alcohol, oil, ethylene glycol, and water.

The conductor 340 and the tube 520 are positioned inside tube 550. The space between the outer surface of the conductor 340 and the inner surface of the tube 550 is the channel 540. The conductor 340 may be encased in a protective material (not shown in FIG. 19), so that the channel 540 is formed between an outer surface of the protective material and an inner surface of tube 550. As with the tube 520, the tube 550 is formed of a material that is an electrical insulator and is thermally conductive. The conductor 342 may be spirally-wound wires that are wound around the tube 550. The conductor 342 is electrically conductive and also thermally conductive. The tube 550 electrically insulates the conductor 342 from the conductor 340.

The liquid medium that flows through the channel 510 may also flow through the channel 540. The liquid medium provides heat to or extracts heat from the conductor 340 and the conductor 342. The channel 510 may form a circuit (e.g., physical pathway, channel) with the channel 540 so that the liquid medium flows in a circuit through channel 510 and channel 540. Channel 510 may be fluidly coupled to channel 540 any manner. Charging station 100 may be the source of the liquid medium. Charging station 100 may include a pump 290 for moving the liquid medium through the channel 510 and the channel 540.

The tube 550 is encased in the insulator 350. The insulator 350 may be thermally less conductive (e.g., nonconductive). The insulator 350 may protect the conductor 342 and everything inside of the conductor 342 from the elements and from electrical shorts. The insulator 350 also insulates the liquid medium in channel 510 and channel 540 from the temperature of the environment thereby allowing the liquid medium to cool or heat in a more controlled environment.

The conductor 340 and the conductor 342, as discussed above, may establish a circuit for a current flow. The current that flows through the circuit established by the conductor 340 and the conductor 342 is the current provided by the charging station 100 to charge a battery in a vehicle. The circuit may carry up to 1000 amps at 1600 volts. The material of tube 550, the tube 520, and the insulator 350 must be able to withstand such current and voltage without breaking down.

As discussed above, the channel 510 and the channel 540 may be arranged in a circuit (e.g., be in fluid communication), so that the liquid medium that flows through the channel 510 also flows through the channel 540, and possibly also through handle 130 as discussed above. Arranging the channels 510 and 540 so that the liquid medium flows in a circuit facilitates maintaining the conductor 340 and the conductor 342 at the same temperature or to within a few degrees of each other. The liquid medium may flow in any direction (e.g., inside to outside, outside to inside). When the liquid medium flows through the outside channel (e.g., channel 540) before flowing through the inside channel (e.g., 510), the outside of electrical cable 500 is likely to be maintained cooler than the interior of the cable.

The insulator 350 encloses the conductor 342, the tube 550, the channel 540, the conductor 340, the tube 520, and the channel 510. The insulator 350 electrically insulates a user from the current carried by the conductor 342 and the conductor 340. The insulator 350 protects the electrical cable 500 during use and from the elements.

As discussed above, the charging handle 130 may also include channels for a liquid medium for cooling or heating the conductors 340 and 342 in the handle 130, and the electrode 330 and the ring 332, although no specific implementation is shown herein. The channels for the liquid medium may be formed of the material that forms the housing 310. The channels in the charging handle 130 may be integral to (e.g., integrated into, a part of) the housing 310. The channels for the liquid medium in the handle 130 may surround the electrode 330 and the ring 332 as the channel 540 surrounds the conductor 340.

The channels in the charging handle 130 may be separate from or in fluid communication with the channels 510 and 540. The channels of the electrical cable 500 and the charging handle 130 may be connected to form a circuit through which the liquid medium flows to maintain the conductor 340, the conductor 342, the electrode 330, and the ring 332 at about the same temperature.

The flow of 1000 amps through the conductors of electrical cable 140/500 and charging handle 130 is likely to produce some heat, so the liquid medium will likely need to cool the conductors.

Referring to FIG. 5, an inside diameter of the tube 550 is the diameter 586. The outside diameter of the conductor 340 is the diameter 584. The diameter 584 is less than the diameter 586 thereby establishing (e.g., creating) the channel 540. The difference between the diameter 586 and the diameter 584 must leave enough room (e.g., area) for the channel 542 carry (e.g., transport) sufficient liquid medium to maintain the electric cable 500, and possibly the handle 130, at a predetermined temperature.

The outside diameter of the tube 520 is the diameter 582. The inside diameter of the tube 520 is the diameter 580. The diameter 580 establishes the area of the channel 510. The diameter 580 must create enough area for the channel 510 to carry sufficient liquid medium to maintain the electric cable 500, and possibly the handle 130, at the predetermined temperature.

Power Source

Utility and Battery

The charging station 100 may include connectors for connecting to a source of electrical energy. The source of electrical energy provides energy for the charging station 100 to operate and to charge batteries. In particular, the source of electrical energy provides energy to power supply 242 for charging the battery of an electric vehicle. For example, a power source 600 may include the utility 620 and the battery 610. The battery 610 may electrically couple to and provide energy to the charging station 100. The battery 610 is optional and may be omitted. In the event that the battery 610 is not used, the utility 620 electrically couples to the charging station 100 to provide energy to the charging station 100.

As discussed herein, the charging station 100 may provide about 1000 amps at between 1500 and 1600 volts, so the power provided by the charging station 100 may be between 1.5 mega-watts and 1.6 MW. Some larger, better equipped houses may have a 300-amp service that provides 300 amps at 220 volts. Such houses are capable of providing only 66 KW of power, which is less than a twentieth of the power required for the charging station 100. So, the charging station 100 will likely not be based in residential homes.

Primary utility lines may provide a current at between 2,300-25,000 volts. A primary utility line is suitable for providing the power needed by the charging station 100. A primary utility line is suitable for providing power for several charging stations 100 located at a single geographic location.

If the battery 610 is part of the power source 600, the battery 610 may act as a buffer between the utility 620 and the charging station 100. The battery 610 may operate to reduce variations in the power provided to the charging station 100 as compared variations in the power provided by utility 620. The battery 610 may provide power to more than one charging station 100. Using the battery 610 to maintain the electrical specifications (e.g., maximum voltage, minimum voltage, maximum current, minimum current, maximum slew rate (e.g., voltage spikes), minimum slew rate) needed by the charging station 100, as opposed to requiring the utility 620 to meet the specifications, reduces the delivery and operating requirements on the utility thereby lowering the cost of deploying the charging station 100. The battery 610 relieves the utility from conditioning the electricity provided by the primary lines thereby reducing the cost to the utility and thereby the cost of installing the charging station 100. The battery 610 further holds a reserve of power to charge multiple vehicles at the same time via two or more charging stations 100.

Shipping Container

The battery 610 and the charging stations 100 may be packaged for easy and cost-effective deployment. The battery 610 and the charging stations 100 may be packaged in a conventional shipping container (e.g., intermodal container, corrugated steel boxes) for deployment. The battery 610 and the charging stations 100 may remain in the shipping container during their lifetimes and during use.

For example, the shipping container 700 encloses the battery 610 and the charging stations 100 shown in FIG. 7. The shipping container 700 may be transported to a geographic location identified as a charging station (e.g., site). The shipping container 700 may be positioned at the geographic location so that up to eight vehicles may be positioned proximate to the shipping container 700 for charging. The shipping container 700 includes eight charging stations 100 to charge up to eight vehicles at the same time.

After the shipping container 700 is positioned at the geographic location, the utility 620 may extend primary lines to the shipping container 2100. The primary lines are electrically coupled to the battery 610. The outside walls of the shipping container 700 may be removable, at least in part, to expose the charging stations 100. The battery 610 provides power to charging stations 100, which provide power for recharging one vehicle at each charging station 100.

A shipping container of any size may be used to package batteries and charging stations for deployment. In one implementation, a small shipping container may deploy one of the batteries 610 and one charging station 100. In another implementation, a medium-sized shipping container may deploy one of the batteries 610 and four charging stations 100. In another implementation, a larger shipping container deploys one or more of the batteries 610 and up to 16 charging stations 100.

In another implementation, the shipping container contains the equipment (e.g., batteries 610) needed to support multiple charging stations, but it does not contain the charging stations themselves. The charging stations may be positioned around the geographic location and electrically coupled to the shipping container that contains the batteries 610. The equipment in the shipping container provides the energy needed by the charging stations to charge vehicles.

The utility would need to provide enough power via the primary lines for each of the charging stations to provide 1.5 MW of power for charging vehicles. For example, if the primary power lines provide power at 25 kilo-volts, the utility will need to provide about 480 amps at 25 kV to meet the power requirements of eight charging stations. It is anticipated that charging a single vehicle will take approximately 15 minutes.

Solar cells may be positioned on the top of shipping container 700 to provide additional power for operating the equipment in the shipping container hundred and for possibly charging vehicles.

Support for Cable

The charging station 100 may include any structure suitable for supporting the weight of the electrical cable 140 or 500 to facilitate use of the electrical cable by a user. Because the conductors 340 and 342 are large, the electrical cable 140 and 500 likely will be heavy and possibly difficult for some users to lift and use. A portion of the electrical cable 140 and 500 may be suspended and/or supported to aid in lifting and/or moving the electrical cable 140 and 500 by a user. The structure used to support the weight of the electrical cable 140 and 500 may support between 50% and 90%, preferably between 50% and 70%, of the weight of electrical cable 140 or 500 to facilitate manipulation by a user.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that is not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A charging station for charging a battery of a provided electric vehicle, the charging station comprising:
    a housing, the housing includes a socket;
    a handle, the handle includes an electrode and a ring, the handle configured to be inserted into the socket, the handle further configured to be inserted into a receiver of the provided electric vehicle for charging the battery;
    a first terminal and a second terminal positioned in the socket, the first terminal and second terminal configured to electrically connect with the electrode and the ring respectively of the handle;
    a testing circuit couple to the first terminal and the second terminal; and
    a locking mechanism; wherein:
        while the handle is inserted into the socket, the testing circuit is configured to perform a test;
        while the testing circuit performs the test, the testing circuit is configured to:
            control the locking mechanism to pull the handle deeper into the socket to bring the first terminal and the second terminal into electrical contact with the electrode and the ring respectively;
            control the locking mechanism to secure the handle in the socket, whereby the handle cannot be removed from the socket by a user; and
            apply a voltage across the first terminal and the second terminal, and thereby across the electrode and the ring, to perform the test; and
        after the testing circuit performs the test, the testing circuit is configured to:
            control the locking mechanism to release the handle; and
            control the locking mechanism to push the handle outward in the socket to disconnect the first terminal and the second terminal from the electrode and the ring respectively, whereby the handle may be removed from the socket by the user to charge the battery of the provided electric vehicle.

2. The charging station of claim 1 wherein:
    the locking mechanism comprises a first threads;
    the handle comprises a second threads;
    the locking mechanism is configured to rotate in a first direction whereby the first threads engage the second threads to pull the handle deeper into the socket and to secure the handle in the socket; and
    the locking mechanism is configured to rotate in a second direction, opposite the first direction, to push the handle outward in the socket whereby the first threads disengage from the second threads to release the handle in the socket.

3. The charging station of claim 1 wherein:
    the locking mechanism comprises a hook;
    the handle comprises a lip;
    the locking mechanism positions the hook over the lip to secure the handle in the socket; and
    the locking mechanism removes the hook from the lip to release the handle in the socket.

4. The charging station of claim 1 wherein the locking mechanism uses a magnetic force to secure the handle in the socket.

5. The charging station of claim 1 wherein the locking mechanism uses a magnetic force to secure the handle in the socket.

6. The charging station of claim 1 wherein the test comprises measuring and impedance of an electrical path through the handle.

7. The charging station of claim 1 wherein the test comprises applying a maximum voltage between the electrode and the ring.

8. The charging station of claim 1 wherein the test comprises directing a maximum current through the electrode and the ring.

9. The charging station of claim 1 wherein the test comprises detecting a temperature of the handle.

10. The charging station of claim 1 further comprising a first conductor, a second conductor and a power supply, wherein:

the first conductor electrically couples the power supply to the electrode;

the second conductor electrically couples the power supply to the ring; and the power supply applies the voltage across the first terminal, the first conductor and the electrode, the second terminal, the second conductor and the ring.

11. The charging station of claim 1 further comprising a seal wherein:

the seal is positioned around an inner surface of the socket; and the seal is configured to seal between an inner surface of the socket and an outer surface of the handle while the handle is inserted into the socket.

12. The charging station of claim 11 wherein the seal is formed of an electrical insulator.

13. A charging station for charging a battery of a provided electric vehicle, the charging station comprising:

a housing, the housing includes a socket;

a handle, the handle configured to be inserted into the socket, the handle further configured to be inserted into a receiver of the provided electric vehicle for charging the battery;

a first terminal and a second terminal positioned in the socket, the first terminal and second terminal configured to electrically connect with the handle;

a testing circuit coupled to the first terminal and the second terminal, the testing circuit configured to perform a test; and a locking mechanism, the locking mechanism configured to move the handle inward and outward with respect to the socket while the handle remains in the socket; moving the handle inward brings the first terminal and the second terminal into electrical contact with the handle, moving the handle outward disconnects the first terminal and the second terminal from electrical contact with the handle, the locking mechanism further configured to secure the handle in the socket while the first terminal and the second terminal are in electrical contact with the handle and while the testing circuit performs the test on the handle via the first terminal and the second terminal; wherein:

while the locking mechanism secures the handle in the socket, a user cannot remove the handle from the socket.

14. The charging station of claim 13 while the locking mechanism does not secure the handle in the socket and while the first terminal and the second terminal are not in electrical contact with the handle, the user can remove the handle from the socket.

15. The charging station of claim 13 further comprising a cable having a first conductor and a second conductor, an electrode and a ring, wherein:

the electrode and the ring are positioned in the handle;

the electrode and the ring electrically couple to the first conductor and the second conductor respectively;

the locking mechanism is configured to move the handle inward with respect to the socket to bring the first terminal and the second terminal into contact with the electrode and the ring respectively; and the locking mechanism is configured to move the handle outward with respect to the socket to disconnect the first terminal and the second terminal from electrical contact with the electrode and the ring respectively.

16. The charging station of claim 13 wherein:

the locking mechanism comprises a first threads;

the handle comprises a second threads;

the locking mechanism is configured to rotate in a first direction whereby the first threads engage the second threads to pull the handle deeper into the socket and to secure the handle in the socket; and the locking mechanism is configured to rotate in a second direction, opposite the first direction, to push the handle outward in the socket whereby the first threads disengage from the second threads to release the handle in the socket.

17. The charging station of claim 15 wherein the test comprises measuring and impedance of an electrical path through the handle.

18. The charging station of claim 15 wherein the test comprises applying a maximum voltage between the electrode and the ring.

19. The charging station of claim 15 wherein the test comprises directing a maximum current through the electrode and the ring.

20. The charging station of claim 15 wherein the test comprises detecting a temperature of the handle.

\* \* \* \* \*